US008537340B2

(12) United States Patent
Holzapfel et al.

(10) Patent No.: US 8,537,340 B2
(45) Date of Patent: Sep. 17, 2013

(54) OPTICAL DISTANCE-MEASURING DEVICE (75) Inventors: Wolfgang Holzapfel, Obing (DE);
Michael Stepputat, Traunstein (DE);
Gerhard Vogt, Munich (DE); Florian Garczarek, Lahnau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 183 days.

(21) Appl. No.: 13/172,510

(22) Filed: Jun. 29, 2011

(65) Prior Publication Data
US 2012/0002188 A1 Jan. 5, 2012

(30) Foreign Application Priority Data

Jun. 30, 2010 (DE) .................. 10 2010 030 689

(51) Int. Cl.
*G01C 3/08* (2006.01)
(52) U.S. Cl.
USPC .......................... 356/4.06; 356/4.01; 356/496
(58) Field of Classification Search
None
See application file for complete search history.

(56) References Cited

U.S. PATENT DOCUMENTS

| 3,825,346 | A | * | 7/1974 | Rizzo | 356/28.5 |
|---|---|---|---|---|---|
| 3,930,729 | A | * | 1/1976 | Gunn | 356/450 |
| 5,329,356 | A | * | 7/1994 | Tabarelli et al. | 356/498 |
| 6,069,700 | A | * | 5/2000 | Rudnick et al. | 356/511 |
| 6,147,748 | A | | 11/2000 | Hughes | |
| 6,778,280 | B2 | * | 8/2004 | De Groot et al. | 356/493 |
| 7,095,510 | B2 | * | 8/2006 | Fukui | 356/521 |
| 7,193,726 | B2 | * | 3/2007 | Hill | 356/520 |
| 7,333,214 | B2 | * | 2/2008 | Sesko | 356/493 |
| 7,525,665 | B2 | * | 4/2009 | Lee | 356/493 |
| 7,652,771 | B2 | * | 1/2010 | Felix | 356/493 |
| 7,800,758 | B1 | * | 9/2010 | Bridges et al. | 356/482 |
| 8,345,260 | B2 | * | 1/2013 | Illers et al. | 356/501 |
| 2010/0268499 | A1 | | 10/2010 | Holzapfel | |

FOREIGN PATENT DOCUMENTS

| EP | 0 919 830 | 6/1999 |
|---|---|---|
| JP | 07-120213 | 5/1995 |
| WO | WO 2009/065463 | 5/2009 |

OTHER PUBLICATIONS

T. Takatsuji, et al., "Whole-viewing-angle cat's-eye retroreflector as a target of laser trackers," Meas. Sci. Technol. 10: N87-N90 (1999).
J. P. Oakley, "Whole-angle spherical retroreflector using concentric layers of homogeneous optical media," Applied Optics 46(7): 1026-1031 (2007).

* cited by examiner

*Primary Examiner* — Isam Alsomiri
*Assistant Examiner* — Samantha K Abraham
(74) *Attorney, Agent, or Firm* — Kenyon & Kenyon LLP (57) ABSTRACT An optical distance-measuring device includes a light source, and an interferometer unit having a measuring retroreflector, stationary reference retroreflector, beam-splitter element, beam-recombiner unit, and detection unit. The beam of rays emitted by the light source swivels about the center of the reference retroreflector. The beam of rays arriving from the light source splits via the beam-splitter element into a measuring beam and reference beam. The measuring beam propagates in the direction of the measuring retroreflector, and the reference beam propagates collinearly with the measuring beam in the direction of the reference retroreflector. The measuring beam is reflected back by the measuring retroreflector and the reference beam is reflected back by the reference retroreflector in the direction of the beam-recombiner unit, the measuring beam traveling symmetrically relative to the reference retroreflector prior to and after reflection at the measuring retroreflector.

15 Claims, 7 Drawing Sheets

OPTICAL DISTANCE-MEASURING DEVICE

CROSS-REFERENCE TO RELATED APPLICATIONS

The present application claims priority to Application No. 10 2010 030 689.4, filed in the Federal Republic of Germany on Jun. 30, 2010, which is expressly incorporated herein in its entirety by reference thereto.

FIELD OF THE INVENTION

The present invention relates to an optical distance-measuring device.

BACKGROUND INFORMATION

Such distance-measuring devices are used to determine, with extreme precision, the distance between a stationary and a moving point in space, usually by an interferometric distance measurement. The moving point in space is usually assigned a measuring retroreflector, which a beam of rays from the optical distance-measuring device is made to follow. Based on the distance information obtained in this manner in conjunction, for example, with further spatial angle information and/or distance information, the position of the moving point in space, i.e., the position of the measuring retroreflector in space is able to be determined.

An optical distance-measuring device is described in European Patent No. 0 919 830. In addition to a light source, it includes an interferometer unit having a measuring retroreflector, a reference retroreflector, a beam-splitter element and a detection unit. The beam of rays arriving from the light source is split via the beam-splitter element into a measuring beam of rays and a reference beam of rays. The measuring beam of rays propagates initially in the direction of the reference retroreflector, is reflected from there in the direction of the measuring retroreflector, and from the measuring retroreflector, is reflected back again in the direction of the beam-splitter element. From the beam-splitter element, the measuring beam of rays propagates in collinear fashion with the reference beam of rays in the direction of the detection unit, via which distance-dependent interference signals are ascertainable. In this device, the measuring beam of rays and the reference beam of rays are able to swivel about the reference retroreflector. This is ensured by a suitably designed swivel unit that includes, inter alia, the light source and several interferometer components. The reference retroreflector for the collimated reference beam of rays, swiveled about a sphere, is realized by the stationary reflecting sphere in conjunction with a focusing lens swiveled together with the reference beam of rays. The collimated reference beam of rays is focused by the lens onto the surface or the center of the reflecting sphere. With the aid of this distance-measuring device, the distance between the stationary reference retroreflector and the measuring retroreflector movable in space is able to be determined interferometrically. By a tracking unit, the measuring beam of rays is made to follow the measuring retroreflector, so that in this manner, a continuous distance measurement is possible, that is, even when the measuring retroreflector is moving in space.

It must be mentioned as a disadvantage of the approach described in European Patent No. 0 919 830 that it is relatively susceptible to dirt. This holds true especially for the variant in which the beam of rays emitted by the light source is focused onto the surface of the metallic, spherical reference retroreflector and is reflected from there. Any dirt existing on the reference retroreflector greatly impairs the interference signal generated. Furthermore, measuring errors and losses with respect to the degree of signal modulation result if the swivel unit is displaced tangentially or radially relative to the ideal position. Therefore, considerable demands are placed on the accuracy of the guidance mechanism of the swivel unit if such problems are to be avoided.

A further optical distance-measuring device is described in Japanese Published Patent Application No. 7-120213. An interferometric distance measurement between a spherical measuring retroreflector and a stationary, spherical reference retroreflector is provided here, as well. The measuring beam of rays and the reference beam of rays are likewise able to swivel about the reference retroreflector. The swivel unit provided for this purpose contains various optical elements such as reflecting prisms and beam splitters for guiding the different beams of rays. The light source is placed outside of the swivel unit. This optical distance-measuring device has the disadvantage that an extremely precise and therefore costly positioning of the various optical elements in the swivel unit is necessary.

SUMMARY

Example embodiments of the present invention provide an optical distance-measuring device by which measuring errors are able to be avoided even in the event the individual optical elements are not ideally positioned. The simplest possible design of the distance-measuring device, especially the guidance mechanism for swiveling the measuring beam of rays about the reference retroreflector, is also desirable.

It should be noted as a particular advantage of the optical distance-measuring device that it is insensitive to possible tangential displacements of the swivel unit—able to be swiveled about the reference retroreflector—out of the ideal position. Moreover, unlike conventional devices, possible radial displacements of the swivel unit out of the ideal position also do not lead to losses in the degree of signal modulation. Both advantages are attributable to the fact that no focusing, and therefore, in the case of a fault, no superimposition of differently curved or differently oriented wave fronts of the beams of rays from the interferometer measuring arm and the interferometer reference arm takes place. Therefore, a markedly simpler guidance mechanism may be used for the swivel unit, resulting in a less costly overall system.

According to an example embodiment of the present invention, an optical distance-measurement device includes: a light source; and an interferometer unit having a measurement retroreflector, a stationary reference retroreflector, a beam-splitter element, a beam-recombiner unit, and a detection unit. A beam of rays emitted by the light source is swivelable about a center of the reference retroreflector, and the beam-splitter element is adapted to split the beam of rays arriving from the light source into at least one measurement beam of rays and a reference beam of rays. The at least one measurement beam of rays propagates in a direction of the measurement retroreflector and the reference beam of rays propagates collinearly with respect to the at least one measurement beam of rays in a direction of the reference retroreflector. The measurement retroreflector is adapted to reflect back the measurement beam of rays and the reference reflector is adapted to reflect back the reference beam of rays in a direction of the beam-recombiner unit, the at least one measurement beam of rays, prior to and after reflection at the measurement retroreflector, traveling symmetrically relative to the reference retroreflector. The beam-recombiner unit is adapted to bring the at least one measurement beam of rays and the reference beam of rays to interference, and the detection unit is adapted to ascertain distance-dependent interference signals.

The beam-recombiner unit may include at least one optical element adapted to compensate for misalignment between at least one measurement beam of rays falling on it and the reference beam of rays falling on it, and to superimpose them collinearly such that the detection unit is able to generate a plurality of collinearly superimposed pairs of measurement and reference beams of rays with interference signals phase-shifted relative to each other.

At least one measurement beam of rays, prior to and after retroreflection at the measurement retroreflector, may travel axisymmetrically relative to an axis of symmetry of the retroreflection that is parallel to a direction of incidence of the beam of rays incoming from the light source, and extends through a center of the reference retroreflector.

The optical distance-measurement device may further include: a swivel unit adapted to swivel about a center of the stationary reference retroreflector and in which at least the beam-recombiner unit, the detection unit, and one of (a) the light source and (b) an outcoupling-side end of an optical fiber are disposed, so that the beam of rays emitted by the light source is swivelable about the reference retroreflector; and a tracking unit, adapted to make the swivel unit follow the measurement retroreflector, including a tracking-detection device adapted to ascertain an instantaneous alignment of the at least one measurement beam of rays in relation to the measurement retroreflector.

The optical distance-measurement device may further include an evaluation unit adapted to determine, from the interference signals ascertained via the detection unit, a distance between a center of the reference retroreflector and a center of the measurement retroreflector.

The reference retroreflector may be spherical, so that at least a portion of the reference beam of rays falling on it is focused by the reference retroreflector onto a reflective inner surface of the sphere, and from there, the reference beam of rays is reflected back in a direction of the beam-recombiner unit, and the reference retroreflector may be one of: (a) formed of one transparent sphere, and the sphere material has a refractive index of n=2; and (b) formed of a plurality of sphere shells having different refractive indices and different radii.

A beam of rays emitted by the light source may have a beam cross-section that is larger than a diameter of the reference retroreflector, and the reference retroreflector may be arranged as a geometrical beam splitter in a beam path of the beam of rays emitted by the light source and is adapted to split the beam of rays into a measurement beam of rays and a reference beam of rays.

The reference beam of rays may be reflected by the reference retroreflector back in a direction of the beam-recombiner unit, and the measurement beam of rays may propagate in circular-symmetrical fashion with respect to the reference retroreflector in a direction of the measurement retroreflector and back in a direction of the beam-recombiner unit.

The beam-splitter element may include at least one grating, from which a partial beam of rays diffracted in the zeroth order of diffraction function one of: (a) as a measurement beam of rays which propagates in a direction of the measurement retroreflector, and a partial beam of rays diffracted by the grating into a further order of diffraction functions as a reference beam of rays that propagates in a direction of the reference retroreflector; and (b) as a reference beam of rays which propagates in a direction of the reference retroreflector, and a partial beam of rays diffracted by the grating into a further order of diffraction functions as a measurement beam of rays that propagates in a direction of the measurement retroreflector.

The beam-splitter element may include at least one polarization-optical beam-splitter element, from which a transmitted partial beam of rays functions one of: (a) as a measurement beam of rays which propagates in a direction of the measurement retroreflector, and a partial beam of rays which is reflected by the beam-splitter element and which has a polarization oriented perpendicularly to the measurement beam of rays functions as a reference beam of rays that propagates in a direction of the reference retroreflector; and (b) as a reference beam of rays which propagates in a direction of the reference retroreflector, and a partial beam of rays which is reflected by the beam-splitter element and which has a polarization oriented perpendicularly to the reference beam of rays functions as a measurement beam of rays that propagates in a direction of the measurement retroreflector.

The beam-recombiner unit may include at least one first grating via which a superimposition of the parallel-displaced measurement beam of rays and reference beam of rays falling on it results at one location, and the measurement beam of rays and reference beam of rays may be collinearly superimposed via at least one second grating.

The beam-recombiner unit may include at least one polarization-optical beam-splitter element, via which a collinear superimposition of the parallel-displaced measurement beam of rays and reference beam of rays, polarized perpendicularly relative to each other and falling on the beam-splitter element, results at one location.

A polarization-optical component, which includes a polarization-optical beam-splitter element and a lambda/4 plate, may be arranged in front of the reference retroreflector in the beam path of the beam of rays emitted by the light source, so that: a linearly polarized beam of rays incoming from the light source transits the polarization-optical beam-splitter element without loss; the beam of rays subsequently passes through the lambda/4-plate a first time; the measurement beam of rays and reference beam of rays, reflected back by the measurement retroreflector and the reference retroreflector, pass through the lambda/4 plate a second time; and then the measurement beam of rays and the reference beam of rays strike the polarization-optical beam-splitter element again, from which a complete reflection of the measurement beam of rays and the reference beam of rays takes place in a direction of the beam-recombiner unit.

The detection unit may include at least one grating which the measurement beam of rays and the reference beam of rays, reflected back by the measurement retroreflector and the reference retroreflector, strike with different angles of incidence after deflection by an upstream optical element, at least one of (a) the grating is arranged spatially and (b) grating parameters are selected such that, starting from the grating, beam pairs made up of diffracted measurement beams of rays and reference beams of rays propagate in at least three different spatial directions, in a direction of detector elements, by which the interference signals, phase-shifted relative to each other, are generatable.

The detection unit may include at least one polarization-optical components at least one of (a) arranged and (b) formed such that a plurality of phase-shifted interference signals are generatable from collinearly superimposed measurement beams of rays and reference beams of rays polarized perpendicularly relative to each other.

Further features and aspects of example embodiments of the present invention are described in more detail below with reference to the appended Figures. It is also possible to otherwise combine the individual measures explained below.

BRIEF DESCRIPTION OF THE DRAWINGS

FIG. 1b is a cross-sectional view of the interferometer measuring arm illustrated in FIG. 1a.

FIG. 2 is a cross-sectional view of the interferometer measuring arm of a modified variant of the optical distance-measuring device illustrated in FIG. 1a.

FIG. 3 illustrates a beam-splitter element and a beam-recombiner unit for the optical distance-measuring device illustrated in FIG. 1a.

FIG. 4 illustrates a beam-splitter element and a beam-recombiner unit for optical distance-measuring device illustrated in FIG. 1a.

FIG. 5b is a cross-sectional view of the interferometer measuring arm illustrated in FIG. 5a.

DETAILED DESCRIPTION

In the following, a first exemplary embodiment of the optical distance-measuring device is described with reference to the highly schematic representation in FIGS. 1a and 1b.

The optical distance-measuring device includes a light source 10, e.g., in the form of a laser light source, as well as an interferometer unit having a measuring retroreflector 21, a stationary reference retroreflector 22, a beam-splitter element 23, a beam-recombiner unit 24 and a detection unit 25. As indicated in FIG. 1a by the broken-line arrow, beam of rays S emitted by light source 10 is able to swivel about the center of reference retroreflector 22. To that end, a swivel unit able to swivel about the center of stationary reference retroreflector 22 is provided, which for reasons of clarity, is not shown in FIG. 1a. Reference is made to the subsequent description of FIGS. 9a, 9b with regard to the possible form of the swivel unit in the optical distance-measuring device.

According to the present exemplary embodiment, stationary reference retroreflector 22 is preferably spherical. In this context, the center of the reference retroreflector coincides with the midpoint of the sphere, as apparent from FIG. 1a. In principle, however, other arrangements of reference retroreflectors may also be provided, e.g., triple prisms, triple mirrors, multipart sphere shells, etc. The position of the center of the reference retroreflector is specific for the respective particular arrangement of the reference retroreflector. Further details concerning this are obtained from the description below.

In the interferometer unit, beam of rays S arrives first of all at beam-splitter element 23, indicated only in schematic fashion, and is split there into at least one measuring beam of rays MS and one reference beam of rays RS. An interferometer measuring arm is formed in the interferometer unit over the beam path of measuring beam of rays MS, and an interferometer reference arm is formed over the beam path of reference beam of rays RS. Reference is made to the subsequent description of FIGS. 3 and 4 with regard to practical forms of beam-splitter element 23 in this specific arrangement of the optical distance-measuring device.

After the splitting via beam-splitter element 23, measuring beam of rays MS propagates further in the direction of measuring retroreflector 21, and reference beam of rays RS propagates parallel to measuring beam of rays MS in the direction of reference retroreflector 22.

Measuring beam of rays MS proceeding in the interferometer measuring arm passes to the side of stationary reference retroreflector 22 and arrives at measuring retroreflector 21 movable in space. Measuring retroreflector 21 is joined mechanically to an object whose position in space must be detected as precisely as possible. From measuring retroreflector 21, a retroreflection of measuring beam of rays MS that is axisymmetrical with respect to axis of symmetry SA of the retroreflection takes place in the direction of beam-recombiner unit 24. As illustrated in the Figure, axis of symmetry SA of the retroreflection extends parallel to incident beam of rays S and through the center of spherical reference retroreflector 22. Therefore, on the path between measuring retroreflector 21 and beam-recombiner unit 24, measuring beam of rays MS again passes to the side of reference retroreflector 22. Therefore, prior to and after the reflection at measuring retroreflector 21, measuring beam of rays MS extends symmetrically relative to reference retroreflector 22 in the interferometer measuring arm, especially axisymmetrically with respect to axis of symmetry SA of the retroreflection. FIG. 1b shows a cross-sectional view of the beam path in the interferometer measuring arm in the area of reference retroreflector 22, with measuring beams of rays MS extending symmetrically with it, on the way to and from measuring retroreflector 21.

After a suitable deflection, reference beam of rays RS propagating in the interferometer reference arm strikes reference retroreflector 22 and is reflected back by it in the direction of beam-recombiner unit 24. As FIG. 1a clearly shows, reference beam of rays RS is reflected by reference retroreflector 22 back into the direction of incidence before it finally arrives at beam-recombiner unit 24, likewise indicated only in highly schematic fashion. Reference is made to the subsequent description of FIGS. 6 and 8 with regard to the specific form of a suitable beam-recombiner unit 24.

In beam-recombiner unit 24, parallel-extending measuring and reference beams of rays MS, RS reflected back to it are brought to interference. This is accomplished by compensating in beam-recombiner unit 24 for the beam misalignment of measuring beam of rays MS and reference beam of rays RS and bringing these beams of rays MS, RS collinearly to superimposition. To that end, beam-recombiner unit 24 preferably includes one or more optical elements which compensate for the error in alignment between the optical axes of measuring and reference beams of rays MS, RS falling on it. For example, suitable deflecting mirrors may be provided in beam-recombiner unit 24 for this purpose.

Phase-shifted interference signals are generated from suitably superimposed measuring and reference beams of rays MS, RS by detection unit 25 downstream of beam-recombiner unit 24. In the case of a relative-measuring interferometer unit, a phase change identical for all phase-shifted interference signals results when the distance between stationary reference retroreflector 22 and measuring retroreflector 21, movable in space, changes. The interference signals, ascertained via detection unit 25, are finally fed to an evaluation unit 26—indicated only in schematic fashion—which from them, determines the distance between the center of reference retroreflector 22 and the center of measuring retroreflector 21. In this manner, by the optical distance-measuring device, an extremely precise interferometric distance measurement may be performed to any point in space to which measuring retroreflector 21 is assigned.

Diverse possibilities exist with regard to the interferometric distance measurement. Thus, as an alternative to the relative measuring mentioned, absolute interferometric measuring methods may also be used, which permit an absolute determination of the distance between the center of the measuring retroreflector and the center of the reference retroreflector, etc.

Figure 1A:
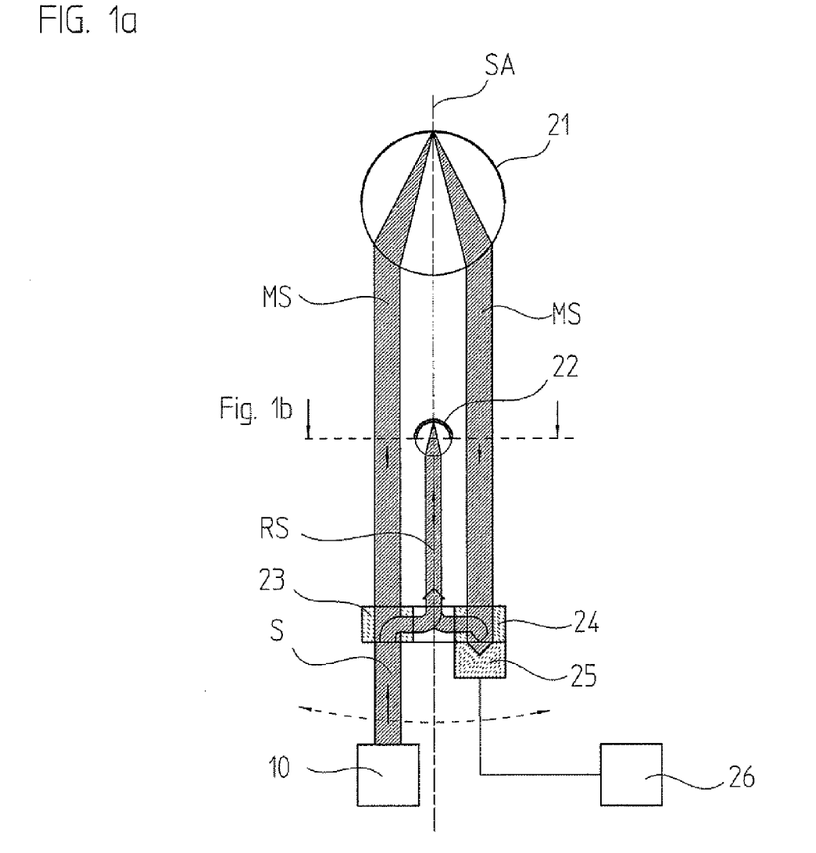
FIG. 1a is a schematized view of an optical distance-measuring device according to an example embodiment of the present invention.
Figure 1B:
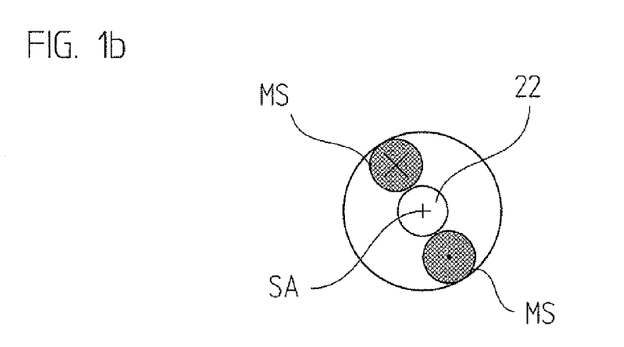

As is apparent from the representation in FIG. 1b, in the present exemplary embodiment, measuring beam of rays MS propagates symmetrically relative to reference retroreflector 22. As indicated above, the travel path is axisymmetrical relative to axis of symmetry SA of the retroreflection.

Figure 2:
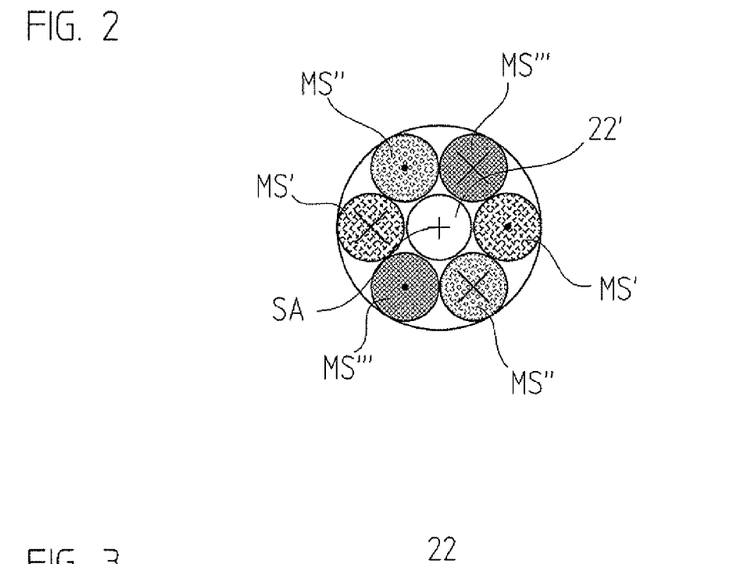

While in the exemplary embodiment in FIGS. 1a and 1b, after the splitting by beam-splitter element 23, only one measuring beam of rays MS propagates in the interferometer measuring arm, as an alternative, it may also be provided to produce a plurality of measuring beams of rays via a suitably arranged beam-splitter element. FIG. 2 shows a cross-sectional view of the measuring arm, corresponding to FIG. 1a, for such an arrangement of the optical distance-measuring device. Three measuring beams of rays MS', MS", MS'" propagate in the interferometer measuring arm. Analogous to the example explained previously, prior to and after the reflection at the measuring retroreflector, each of the three measuring beams of rays MS', MS", MS'" again travels symmetrically relative to reference retroreflector 22'; in particular, the previously mentioned axisymmetry again exists for each individual measuring beam of rays MS', MS", MS'" in relation to axis of symmetry SA of the retroreflection.

In principle, there are various possibilities with regard to the specific form of a suitable reference retroreflector 22. As follows from the schematic representation in FIG. 1a, a spherical formation of reference retroreflector 22 is provided, such that at least a portion of reference beam of rays RS falling on it is focused onto a reflective inner surface of the sphere. From there, reference beam of rays RS falling on it is reflected back in the direction of incidence of the beam, that is, in the direction of beam-recombiner unit 24. The center of such a spherical reference retroreflector 22 corresponds to the midpoint of the sphere. By selecting a spherical reference retroreflector 22, it is ensured that, even given a great variation in the angles of incidence of swiveling beam of rays S onto reference retroreflector 22, the reference point of the length measurement to measuring retroreflector 21 always corresponds to the midpoint of the sphere, and therefore the center of reference retroreflector 22 is stationary.

In example embodiments, reference retroreflector 22 of the device is spherical and is made of one transparent sphere. The sphere material has the refractive index n=2. On this topic, reference is made to the publication "Whole-Viewing-Angle Cat's Eye Retroreflector as a Target of Laser Trackers," Toshiyuki Takatsuji et al., 1999, Meas. Sci. Technol. 10 N87.

As an alternative, however, spherical reference retroreflector 22 may also be made of a plurality of concentrically disposed sphere shells of materials with different refractive indices and different radii. In this manner, spherical errors of the retroreflected phase front may also be reduced. For this, reference is made, for example, to the publication, "Whole-Angle Spherical Retroreflector Using Concentric Layers of Homogeneous Optical Media," J. P. Oakly, Applied Optics, Vol. 46, No. 7, Mar. 1, 2007, p. 1026-1031.

As indicated above, alternatively, the reference retroreflector may also take the form of a triple mirror or triple prism. When using a stationary triple mirror as reference retroreflector, its center lies in the peak of the triple mirror, and is therefore fixed.

The implementation of the reference reflector as a stationary triple prism is also possible. In this case, however, it must be considered that due to the refraction of light at its entrance aperture, the position of the center of the reference retroreflector is dependent on the angle of incidence of the beam of rays falling on it, and therefore, strictly speaking, is no longer stationary. However, this angle dependency is familiar and therefore may be allowed for in good approximation in the evaluation unit.

In principle, the swivel unit is thus swiveled about the center of the respective reference retroreflector. Given a suitable construction of the reference reflector, its center is preferably stationary; in the case of an angle dependency of the position of the center of the reference reflector, this is to be taken into account in the evaluation unit.

Measuring retroreflector 21 may also be constructed analogously to the possibilities for reference retroreflector 22. In principle, besides spherical retroreflectors, other retroreflector variants such as triple prisms or triple mirrors are also options for measuring retroreflector 21, depending on the aperture requirements.

Figure 3:
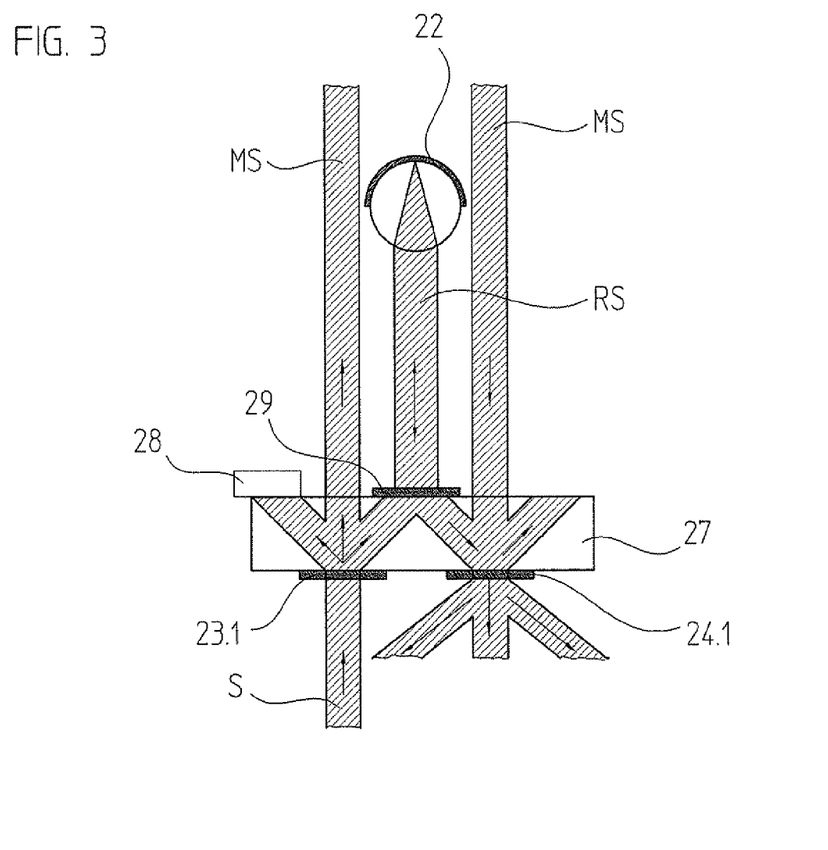

Referring FIG. 3, an example embodiment of the beam-splitter element and the beam-recombiner unit are explained, as may be used in conjunction with the optical distance-measuring device illustrated in FIG. 1a. FIG. 3 shows an enlarged representation of the part of the device according to FIG. 1a in which the beam-splitter element and the beam-recombiner unit are located.

On the left in FIG. 3, as a component of this variant of a beam-splitter element, a grating in the form of a first transmission-diffraction grating 23.1 is discernible, upon which beam of rays S coming from the light source falls. As can be seen, the partial beam of rays, transmitted by a first transmission-diffraction grating 23.1 in the zeroth order of diffraction, propagates as measuring beam of rays MS in the interferometer measuring arm in the direction of the measuring retroreflector. The partial beam of rays deflected by first transmission-diffraction grating 23.1 into a further order of diffraction, e.g., into the +1st order of diffraction, propagates as reference beam of rays RS in the interferometer reference arm in the direction of reference retroreflector 22. The partial beam of rays diffracted in the +1st order of diffraction, i.e., reference beam of rays RS, arrives initially at a third transmission-diffraction grating 29 which diffracts reference beam of rays RS again, so that a resulting order of diffraction ultimately propagates as reference beam of rays RS in the interferometer reference arm parallel to measuring beam of rays MS in the direction of reference retroreflector 22.

The partial beam of rays, which is deflected at first transmission-diffraction grating 23.1 into the −1st order of diffraction and which strikes a reference detector 28, is not used directly for generating a distance-dependent interference signal. For example, the signals generated by reference detector 28 may be used to perform a power measurement with respect to the power of the light source. Alternatively, a measuring signal for a spectroscopic refractive-index determination may also thereby be generated, as is described, for instance, in PCT International Patent Application Publication No. WO 2009/065463.

In the right part of FIG. 3, a recombiner grating in the form of second transmission-diffraction grating 24.1 is discernible as a component of the beam-recombiner unit. Measuring and reference beams of rays MS, RS, reflected back by measuring retroreflector 21 and reference retroreflector 22, strike second transmission-diffraction grating 24.1. In this context, reference beam of rays RS coming from the interferometer reference arm is deflected beforehand by third transmission-diffraction grating 29 when passing through it a second time, into the direction of second transmission-diffraction grating 24.1. Thus, after passing through the interferometer measuring arm and the interferometer reference arm, measuring and reference beams of rays MS, RS come again to superimposition at second transmission-diffraction grating 24.1 and interfere with each other. After passing through second transmission-diffraction grating 24.1, beams of rays finally propagate in at least three different spatial directions, in the direction of the detection unit, not shown. Due to the configuration of second transmission-diffraction grating 24.1, distance-dependent interference signals, phase-shifted with respect to each other by 120°, result in the three spatial directions used.

As indicated in FIG. 3, it may be provided to dispose first transmission-diffraction grating 23.1 and second transmission-diffraction grating 24.1 on a first side of a transparent carrier substrate 27, the first side of carrier substrate 27 facing the light source and the detection unit. Disposed on the second opposite side of carrier substrate 27 is third transmission-diffraction grating 29, which reference beam of rays RS traverses on its way to and from reference retroreflector 22, before it impinges on second transmission-diffraction grating 24.1. Consequently, such an arrangement presents itself especially when gratings are provided as essential functional components both on the side of the beam-splitter element and on the side of the beam-recombiner unit.

Moreover, in the arrangement shown in FIG. 3, it is provided to compensate for the spherical error which the phase front of reference beam of rays RS experiences upon retroreflection via reference retroreflector 22. For this purpose, in addition to a deflection function, a wave-front correction function is also integrated into third transmission-diffraction grating 29. This is usually realized by forming third transmission-diffraction grating 29 as a suitable diffractive structure, e.g., in the form of a blazed structure. In such a structure, the grating lines generally are no longer straight, but rather are curved.

Figure 4:
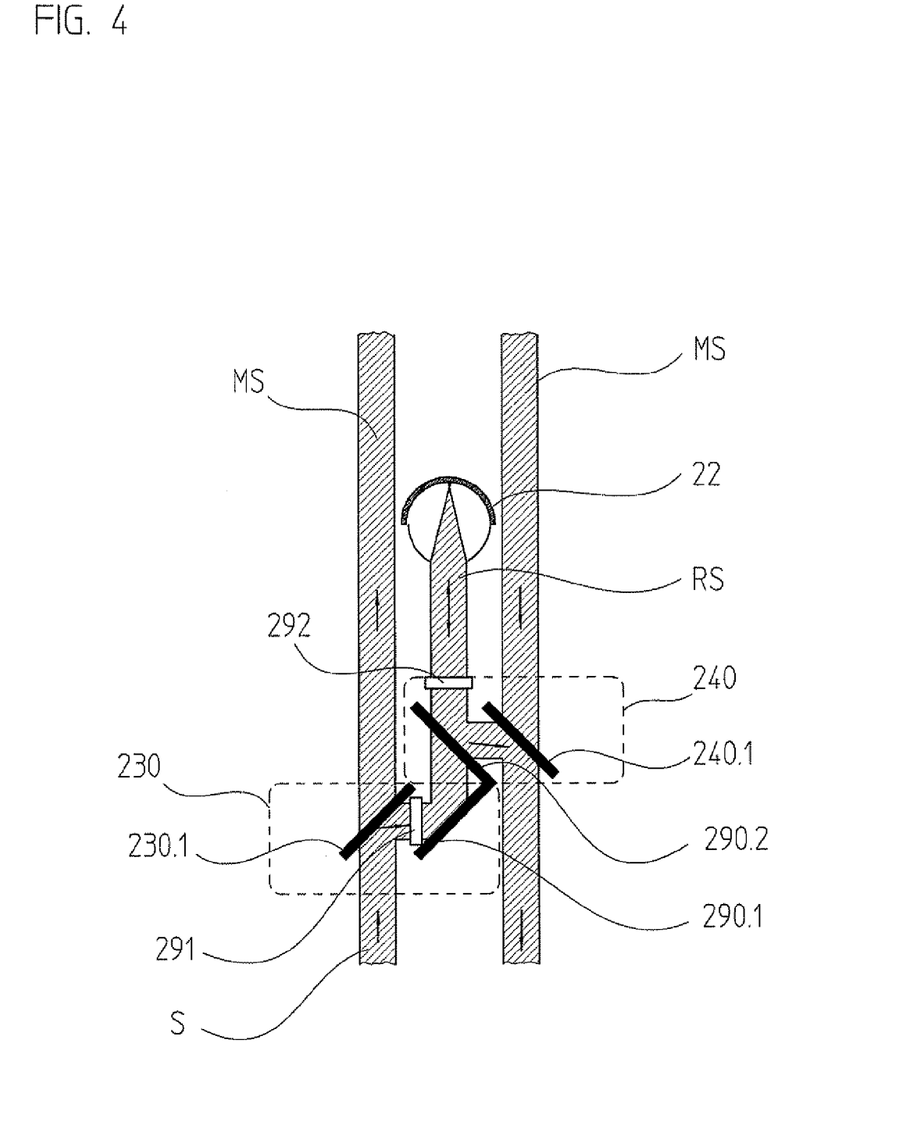

FIG. 4 shows a second possible arrangement of the beam-splitter element and the beam-recombiner unit for the optical distance-measuring device illustrated in FIG. 1a. Again, in an enlarged view, FIG. 4 shows only that part of the device according to FIG. 1a in which beam-splitter element 230 and beam-recombiner unit 240 are located.

Shown on the left in FIG. 4, as a component of beam-splitter element 230, is a first polarization-optical beam-splitter mirror 230.1, on which beam of rays S coming from the light source falls, and which, e.g., is linearly polarized. The linearly polarized partial beam of rays, transmitted undeflected by first polarization-optical beam-splitter mirror 230.1, propagates as measuring beam of rays MS in the interferometer measuring arm in the direction of the measuring retroreflector. The linearly polarized partial beam of rays reflected to the right by first beam-splitter mirror 230.1 in FIG. 4, is polarized in a direction perpendicular to measuring beam of rays MS and propagates as reference beam of rays RS in the interferometer reference arm in the direction of reference retroreflector 22. In this case, the polarization of this partial beam of rays is rotated by 90° via lambda/2 plate 291, so that measuring beam of rays MS and reference beam of rays RS again have the same polarization direction. Subsequently, reference beam of rays RS is deflected initially by 90° via a deflecting mirror 290.1, and then strikes a third polarization-optical beam-splitter mirror 290.2 in beam-recombiner unit 240, which it passes through without loss. The partial beam of rays transmitted undeflected by third polarization-optical beam-splitter mirror 290.2 then proceeds as reference beam of rays RS, parallel to measuring beam of rays MS, in the interferometer reference arm in the direction of reference retroreflector 22. After the retroreflection at the reference retroreflector and passing twice through a lambda/4 plate 292, the polarization of reference beam of rays RS is again rotated by 90°. Therefore, reference beam of rays RS is reflected by third polarization-optical beam-splitter mirror 290.2 without loss, and consequently is deflected in the direction of second polarization-optical beam-splitter mirror 240.1. Accordingly, in this configuration of beam-splitter element 230, at least one polarization-optical beam splitter, which here takes the form of polarization-optical beam-splitter mirror 230.1, acts as a functionally decisive component.

In the right part of FIG. 4, a second polarizing beam-splitter mirror 240.1 is shown as a further component of beam-recombiner unit 240. Measuring and reference beams of rays MS, RS, reflected back by the measuring retroreflector and reference retroreflector 22, strike second polarization-optical beam-splitter mirror 240.1 and subsequently propagate in collinearly superimposed fashion in the direction of the detection unit. Since measuring beam of rays MS and reference beam of rays RS are polarized perpendicularly relative to each other prior to striking second polarization-optical beam-splitter mirror 240.1, these beams of rays are superimposed without loss. Thus, after traversing the interferometer measuring arm and interferometer reference arm, measuring beam of rays MS and reference beam of rays RS come again to collinear superimposition and interference at second polarization-optical beam-splitter mirror 240.1. Thus, in the arrangement of the beam-recombiner unit according to FIG. 4, at least one polarization-optical beam splitter, which here takes the form of polarization-optical beam-splitter mirror 240.1, serves as a functionally decisive component.

An optical distance-measuring device according to an example embodiment of the present invention is explained in the following with reference to FIGS. 5a and 5b. Basically, only the important differences with respect to the exemplary embodiment described above will be discussed.

According to this example embodiment, beam of rays S emitted by light source 110 has a beam cross-section which is larger than the diameter of reference retroreflector 122. Beam of rays S having such a beam cross-section irradiates reference retroreflector 122. The optical function of polarization-optical component 130 between light source 110 and reference retroreflector 122 will be discussed in greater detail in the course of the following description. In this exemplary embodiment, reference retroreflector 122 is therefore used as a beam-splitter element in the beam path of beam of rays S emitted by light source 110. In particular, reference retroreflector 122 functions as a geometrical beam splitter, via which beam of rays S falling on it is split into a measuring beam of rays MS and a reference beam of rays RS. As apparent from FIG. 5a, reference beam of rays RS is reflected back in the direction of incidence, that is, in the direction of beam-recombiner unit 124. The portion of incident beam of rays S not reflected back by reference retroreflector 122 encircles reference reflector 122 in circular-symmetrical fashion and propagates as measuring beam of rays MS in the direction of measuring retroreflector 121, and from it, back in the direction of beam-recombiner unit 124. Analogous to FIG. 1b, FIG. 5b shows a cross-sectional view of the interferometer measuring arm in the area of reference retroreflector 122. The again symmetrical, especially circular-symmetrical course of measuring beam of rays MS relative to reference retroreflector 122 is clearly discernible in this view. Consequently, measuring beam of rays MS travels symmetrically relative to reference retroreflector 122, especially again axisymmetrically with respect to axis of symmetry SA of the retroreflection, in this exemplary embodiment, as well.

Measuring and reference beams of rays MS, RS, falling with a certain misalignment on beam-recombiner unit 124, are collinearly superimposed by it in this exemplary embodiment, as well, and a plurality of distance-dependent phase-shifted interference signals are generated via downstream detection unit 125. Downstream evaluation unit 125 further processes the interference signals thus generated.

Reference retroreflector 122, which in this exemplary embodiment, additionally acts as a geometrical beam splitter, may be implemented as in the first exemplary embodiment discussed above. That is, both the implementation as a transparent sphere having the refractive index n=2 and the implementation in the form of an arrangement of a plurality of concentric sphere shells having different materials and radii are possible. Moreover, depending on the aperture requirement, it may also be provided to form reference retroreflector 122 as a triple mirror or triple prism, if appropriate.

Given a typical diameter $d_s$ of beam of rays S, emitted by light source 110 or possibly expanded, of $d_s$=6 mm, in exemplary embodiments, a spherical reference retroreflector 122 has a diameter $d_{RR}$ of $d_{RR}$=2 mm.

Polarization-optical component 130, arranged between light source 110 and reference retroreflector 122, includes a polarization-optical beam-splitter element 130.1 as well as a lambda/4 plate 130.2. Beam of rays S incoming from light source 110 has a linear polarization and transits beam-splitter element 130.1 in undeflected and lossless fashion during the first traversal. By passing twice through subsequently situated lambda/4 plate 130.2, linearly polarized beam of rays S, i.e., measuring reference beams of rays MS, RS reflected back, then undergoes a rotation of the polarization direction by 90°. Measuring and reference beams of rays MS, RS, modified in this manner in their polarization direction by the lambda/4 plate, upon striking polarization-optical beam-splitter element 130.1 a second time, are finally reflected or deflected completely and without loss in the direction of beam-recombiner unit 124. By polarization-optical component 130, in this example with beam-splitting reference retroreflector 122, it is therefore ensured that measuring and reference beams of rays MS, RS, propagating back in the direction of light source 110, are separated or coupled out from incident beam of rays S and deflected in the direction of beam-recombiner unit 124. Measuring beam of rays MS and reference beam of rays RS each have the same polarization upon striking beam-recombiner unit 124.

As an alternative to the variant with polarization-optical component 130 shown, in principle, a different beam-splitter element could also be used for this purpose at this location in the beam path, e.g., a neutral, non-polarization-optical beam-splitter element. In this case, the lambda/4 plate provided in the example previously described would be eliminated.

In the following, further possibilities for the specific form of the beam-recombiner unit, as well as the detection unit for the optical distance-measuring device will be described with reference to FIGS. 6, 7a to 7c and 8, respectively.

In principle, the beam-recombiner unit in the device ensures that compensation is made for the beam misalignment of the measuring and reference beams of rays falling on it, and a collinear superimposition of these beams of rays results. It is thereby possible in the downstream detection unit to generate phase-shifted periodic interference signals that allow both detection of the moving direction and an interpolation of the position within one signal period of the interference signals. This may be ensured in the device by a directional coding or by a polarization coding of the measuring and reference beams of rays upstream of the detection unit; in principle, mixed forms of this are also possible. The beam-recombiner unit and the detection unit are to be suitably coordinated with each other depending on the coding principle selected.

If a directional coding is carried out, the measuring beam of rays and the reference beam of rays strike at different angles of incidence at the superimposition location in the beam-recombiner unit. This may be utilized in the downstream detection unit for generating phase-shifted interference signals. For example, suitable gratings or grating configurations may be used for this purpose. In the case of a polarization coding, on the other hand, it is ensured that after the collinear superimposition via the beam-recombiner unit, the measuring beam of rays and the reference beam of rays have polarization directions oriented perpendicularly relative to each other. By suitable superimposition of these different polarization directions with the aid of polarization-optical components, phase-shifted interference signals are generated in the downstream detection unit.

Such variants of suitable beam-recombiner units and detection units may be used both in conjunction with the first and in conjunction with the second exemplary embodiment of optical distance-measuring devices.

Figure 6:
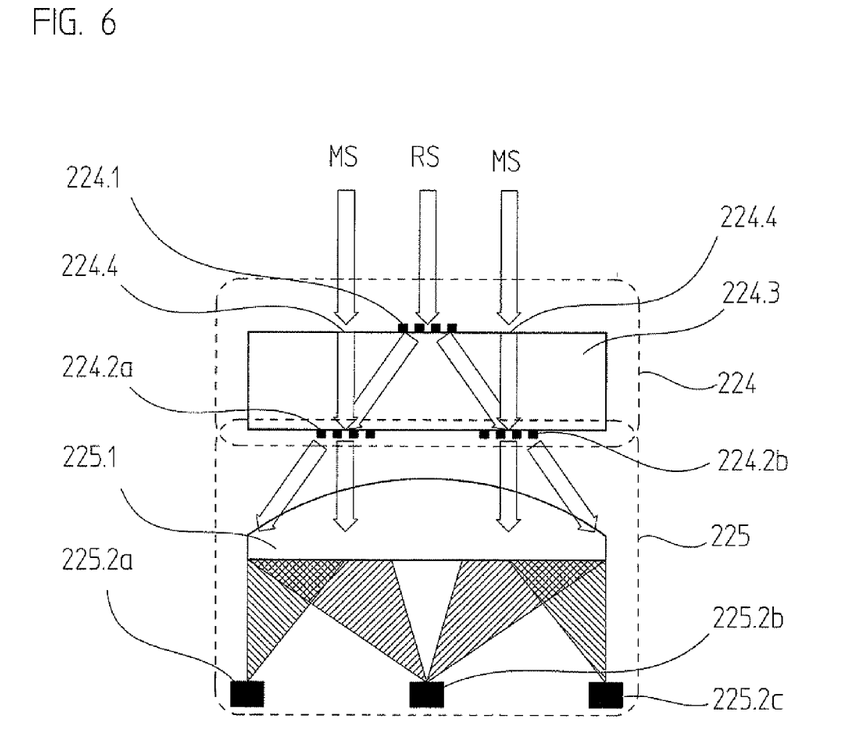
FIG. 6 is a schematic view of a beam-recombiner unit and a detection unit for the optical distance-measuring device.
Figures 7A, 7B, 7C:
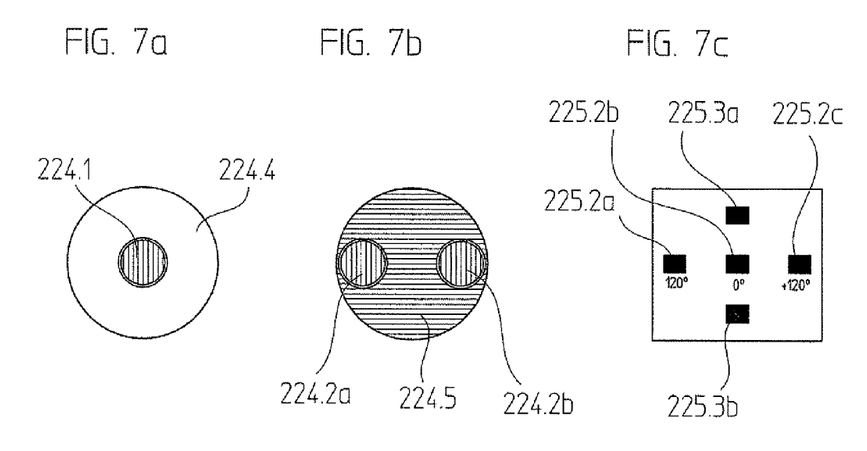
FIGS. 7a to 7c illustrate parts of the beam-recombiner unit and the detection unit illustrated in FIG. 6.

A first variant for the form of beam-recombiner unit 224 and detection unit 225, which is based on the principle of directional coding, is shown in schematic fashion in FIG. 6; FIGS. 7a to 7c show various cross-sectional views from FIG. 6.

According to the variant shown in FIG. 6, beam-recombiner unit 224 includes a transparent carrier substrate 224.3, on whose upper and lower sides, different transmission-diffraction gratings 224.1, 224.2a, 224.2b are disposed. As also apparent from FIG. 7a, on the side of carrier substrate 224.3 facing incident measuring and reference beams of rays MS, RS, a first transmission-diffraction grating 224.1 is situated in the area of incident reference beam of rays RS. In window region 224.4, which surrounds first transmission-diffraction grating 224.1 and on which reflected-back measuring beams of rays MS fall, no optically effective elements are provided in carrier substrate 224.3. Incident reference beam of rays RS is split via first transmission-diffraction grating 224.1 into at least two partial beams of rays which propagate in the direction of the two second transmission-diffraction gratings 224.2a, 224.2b on the lower side of carrier substrate 224.3. Measuring beams of rays MS, transiting window region 224.4 on the upper side of carrier substrate 224.3 undeflected, arrive at the two second transmission-diffraction gratings 224.2a, 224.2b on the lower side of carrier substrate 224.3 for superimposition with the split partial beams of rays of reference beam of rays RS. Finally, from the superimposition location in the region of second transmission-diffraction gratings 224.2a, 224.2b, beams of rays propagate in at least three different spatial directions, in the direction of detection unit 225. On the incoming side, detection unit 225 includes a lens 225.1 that projects or focuses the partial beams of rays, incoming from three different spatial directions, onto three detector elements 225.2a, 225.2b, 225.2c, via which ultimately three distance-dependent interference signals, e.g., phase-shifted by 120°, are ascertainable.

In this variant based on directional coding, second transmission-diffraction gratings 224.2a, 224.2b are components both of beam-recombiner unit 224 and of detection unit 225. The reason is that on one hand, as part of beam-recombiner unit 224, transmission-diffraction gratings 224.2a, 224.2b compensate for the error in beam alignment of the measuring and reference beams of rays, and superimpose them collinearly in effectively zeroth order of diffraction. On the other hand, with the two effectively 1st orders of diffraction, transmission-diffraction gratings 224.2a, 224.2b as part of detection unit 225 generate further pairs of measuring and reference beams of rays MS, RS with interference signals phase-shifted oppositely to the effectively zeroth order of diffraction.

First transmission-diffraction grating 224.1 and the two second transmission-diffraction gratings 224.2a, 224.2b are formed differently in order to ensure the desired generation of the interference signals phase-shifted by 120°. Thus, first transmission-diffraction grating 224.1 has a phase depth of 180° and a line-space ratio of 0.5. It thereby ensures the suppression of the zeroth order of diffraction, so that reference beam of rays RS falling on it is, e.g., split into the +/−1st orders of diffraction. The two second transmission-diffraction gratings 224.2a, 224.2b each have a phase depth of approximately 127° and a line-space ratio of approximately 0.36. These transmission-diffraction gratings 224.2a, 224.2b split the beams of rays falling on them into the zeroth, as well as into the +/−1st order of diffraction, the orders of diffraction thereby split having a relative phase angle of 120°. Furthermore, the two transmission-diffraction gratings 224.2a. 224.2b are disposed on the lower side of carrier substrate 224.3 with a specific displacement distance relative to each other that corresponds to a relative phase angle of 120°.

By such a form and placement of various transmission-diffraction gratings 224.1, 224.2a, 224.2b, it is possible to adjust the desired phase displacement of the three distance-dependent interference signals of 120° in each case which are ascertained via detector elements 225.2a to 225.2c of detection unit 225.

As is apparent from FIG. 7b, which shows a view of the lower side of carrier substrate 224.3, a third transmission-diffraction grating 224.5 is also formed on the lower side of carrier substrate 224.3 adjacent to the regions having second transmission-diffraction gratings 224.2a, 224.2b. The grating structures of third transmission-diffraction grating 224.5 are rotated by 90° relative to the grating structures of second transmission-diffraction gratings 224.2a, 224.2b. In this manner, the beams of rays falling on it experience a deflection effect which is oriented in a direction perpendicular to the deflection effect due to second transmission-diffraction gratings 224.2a, 224.2b. In detection unit 225, the partial beams of rays deflected via third transmission-diffraction grating 224.5 strike two detector elements 225.3a, 225.3b that are shown in FIG. 7c and that are disposed perpendicularly relative to the three detector elements 225.2a to 225.2c provided for ascertaining the distance-dependent interference signals. As already indicated above, for example, a measuring signal for a spectroscopic refractive-index determination may be generated via additional detector elements 225.3a, 225.3b, as is described, for example, in PCT International Published Patent Application No. WO 2009/065463.

As can be seen in FIG. 7b, second transmission-diffraction gratings 224.2a, 224.2b, formed on the lower side of carrier element 224.3 of beam-recombiner unit 224, occupy only a limited circular area there. Preferably, this area is selected to be smaller than the beam cross-section of measuring beams of rays MS falling on it in each case, and larger than the beam cross-section of reference beam of rays RS falling on it. In this manner, the areas having second transmission-diffraction gratings 224.2a, 224.2b act optically like diaphragms for measuring beams of rays MS falling on them. Thus, a possibly-resulting beam misalignment of retroreflected measuring beams of rays MS does not take effect in the plane of these gratings 224.2a, 224.2b, which may occur, for instance, in the case of a faulty positioning of the measuring retroreflector, and apart from that, could possibly cause a faulty signal with respect to the distance measurement.

Figure 8:
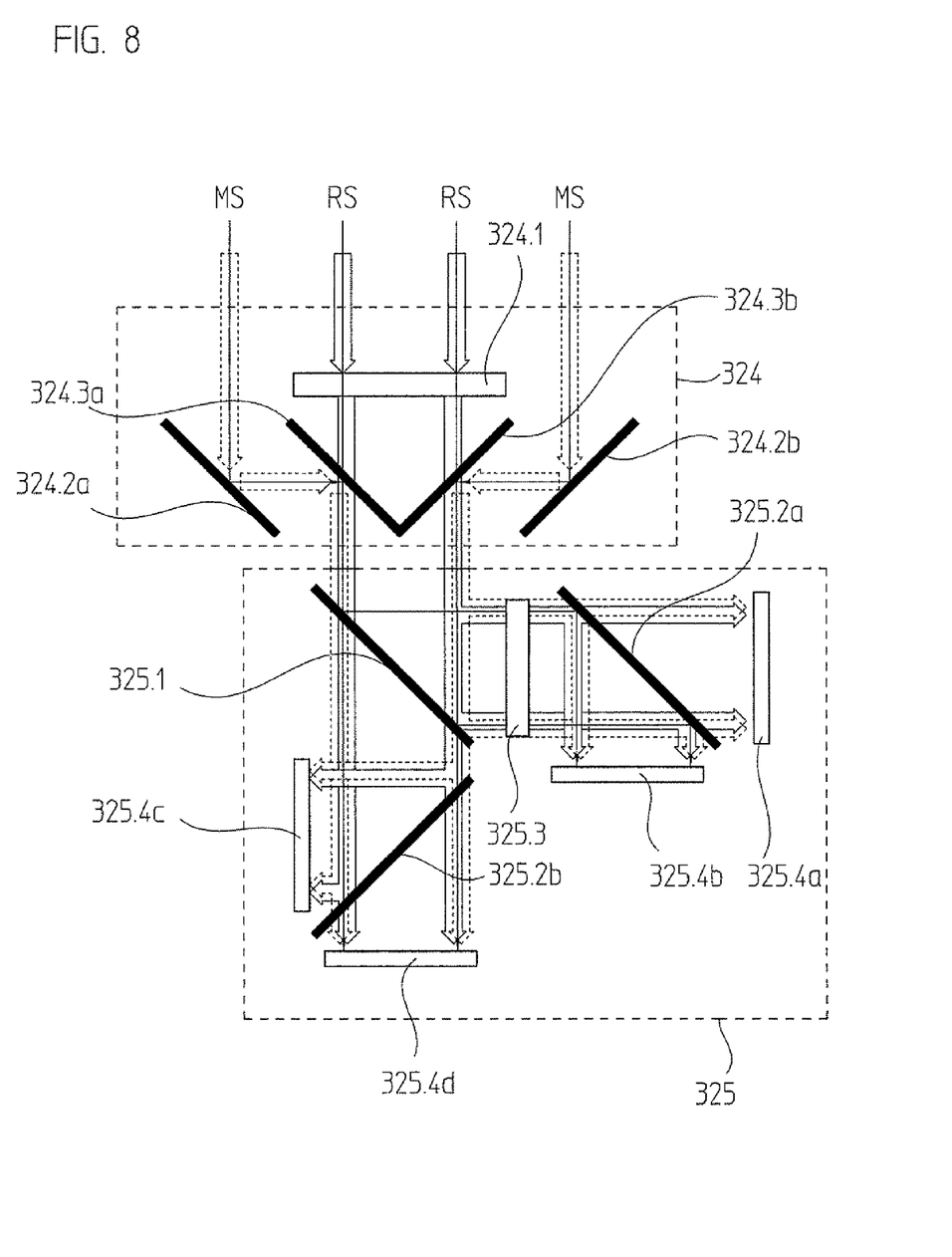
FIG. 8 is a schematic view of a beam-recombiner unit and a detection unit for the optical distance-measuring device.

A second variant for the form of beam-recombiner unit 324 and detection unit 325, based on polarization coding, is shown in schematic fashion in FIG. 8. For example, these exemplary embodiments of beam-recombiner unit 324 and detection unit 325 may be used in the device illustrated in FIG. 5.

Moreover, detection unit 325 may also be combined with the device illustrated in FIG. 4. In this case, beam-recombiner unit 324 from FIG. 8 is not needed, since beam-recombiner unit 240 from FIG. 4 assumes the beam-recombining function along the lines of beam recombiner 240. Thus, a polarization coding of the measuring and reference beams of rays is ensured due to the fact that lambda/4 plate 292 is traversed twice.

Beam-recombiner unit 324 in the example illustrated in FIG. 8 includes one lambda/2 plate 324.1, two deflecting mirrors 324.2a, 324.2b, as well as two first polarization-optical beam-splitter elements 324.3a, 324.3b.

In the example shown, lambda/2 plate 324.1 is arranged in the beam path of reference beam of rays RS falling on beam-recombiner unit 324. The arrangement is provided such that lambda/2 plate 324.1 is oriented at an angle of 45° with respect to the polarization direction of linearly polarized reference beam of rays RS. Thus, by lambda/2 plate 324.1, the polarization direction of reference beam of rays RS is oriented perpendicularly to the polarization direction of measuring beam of rays MS, originally incident with the same polarization direction. Reference beam of rays RS, thus modified in its polarization direction, subsequently strikes first polarization-optical beam-splitter elements 324.3a, 324.3b. Measuring beam of rays MS, deflected via deflecting mirrors 324.2a, 324.2b, likewise strikes these first polarization-optical beam-splitter elements 324.3a, 324.3b. Because of the perpendicular orientation of the polarization directions of measuring and reference beams of rays MS, RS at the location of first polarization-optical beam-splitter elements 324.3a, 324.3b, measuring beam of rays MS is thereby deflected without loss and reference beam of rays RS is transmitted without loss. In this manner, it is therefore again ensured that measuring and reference beams of rays MS, RS, collinearly superimposed, propagate in the direction of detection unit 325.

It should also be pointed out that, in principle, in contrast to the example illustrated in FIG. 8, measuring and reference beams of rays MS, RS could also fall on beam-recombiner unit 324 in interchanged fashion. Accordingly, the polarization direction of measuring beam of rays MS would then be rotated via lambda/2 plate 324.1 by 90° relative to the polarization direction of reference beam of rays RS. It is merely important that the polarization directions of the measuring and reference beams of rays are rotated by 90° relative to each other upstream of first polarization-optical beam-splitter elements 324.3a, 324.3b.

Analogous to the exemplary embodiment of a beam-recombiner unit previously described, it may also be provided to dispose circular diaphragms on the incoming side for the incident measuring or reference beams of rays, in order thereby to eliminate the signal errors due to a possibly existing error in beam alignment of the retroreflected measuring or reference beams of rays MS, RS.

As already indicated above, from the polarization-coded measuring and reference beams of rays, collinearly superimposed via the beam-recombiner unit, the detection unit generates phase-shifted interference signals and detects them. One possibility for generating three interference signals, phase-shifted by 120°, by a suitably configured detection unit is described, for example, in European Patent No. 0 481 356. As an alternative to that, a variant of a detection unit for generating four interference signals, phase-shifted by 90° relative to each other, is described below with reference to FIG. 8.

Detection unit 325 of the exemplary embodiment shown in FIG. 8 includes one polarization-neutral beam-splitter element 325.1, one lambda/4 plate 325.3, second and third polarization-optical beam-splitter elements 325.2a, 325.2b, as well as four detector elements 325.4a, 325.4b, 325.4c, 325.4d.

First of all, incident, collinearly superimposed measuring and reference beams of rays MS, RS are split via polarization-neutral beam-splitter element 325.1 into two pairs of collinearly superimposed measuring and reference beams of rays MS, RS.

The first pair of superimposed measuring and reference beams of rays MS, RS transmitted by polarization-neutral beam-splitter element 325.1 thereupon propagates in the direction of a first polarization-optical beam-splitter element 325.2b. The various polarization states included in measuring and reference beams of rays MS, RS are reflected and transmitted via first polarization-optical beam-splitter element 325.2b according to their projection onto the polarization axes of first polarization-optical beam-splitter element 325.2b. The corresponding beam pairs in transmission and reflection are supplied to detector elements 325.4d and 325.4c, where distance-dependent interference signals, phase-shifted by 180°, are then available for further processing.

The second pair of superimposed measuring and reference beams of rays MS, RS, deflected or reflected by polarization-neutral beam-splitter element 325.1, subsequently passes through a lambda/4 plate 325.3, whereby measuring and reference beams of rays MS, RS, originally linearly polarized in each case, are converted into measuring and reference beams of rays MS, RS polarized circularly in opposite directions. Measuring and reference beams of rays MS, RS, thus modified in their polarization, subsequently strike a second polarization-optical beam-splitter element 325.2a. By second polarization-optical beam-splitter element 325.2a, the various polarization states included in measuring and reference beams of rays MS, RS are again split according to their projection onto the polarization axes of second polarization-optical beam-splitter element 325.2a, and the corresponding beams of rays having linear polarization, oriented perpendicularly relative to each other, in transmission and reflection are supplied to detector elements 325.4a and 325.4b. Distance-dependent interference signals, likewise phase-shifted by 180° relative to each other, are then available at the two detector elements 325.4a, 325.4b. The placement of the two polarization-optical beam-splitter elements 325.2a, 325.2b is selected such that the phase angle of the interference signals at detector elements 325.4a, 325.4b is displaced in each case by 90° with respect to the phase angle of the interference signals at detector elements 325.4c, 325.4d. Accordingly, four distance-dependent interference signals, phase-shifted in each instance by 90°, are present at the output of detection unit 325 for further processing.

According to the preceding description of the exemplary embodiments of suitable beam-recombiner units and detection units, they include certain important components depending on the type of coding selected.

In the case of a directional coding according to the example illustrated in FIGS. 6 and 7a to 7c, for the beam-recombiner unit, it is a question of one or more suitably formed gratings having certain deflection effects on the beams of rays falling on it/them. These gratings ensure that measuring and reference beams of rays have different directions of incidence at the superimposition location, and after the beam-recombiner unit, are collinearly superimposed in at least one effective order of diffraction.

In the case of a polarization coding according to the examples illustrated in FIG. 4 or FIG. 8, one or more polarization-optical beam-splitter elements represent the decisive components of the beam-recombiner unit. They ensure that the measuring beam of rays and the reference beam of rays are collinearly superimposed, and downstream of the beam-recombiner unit, have polarization directions oriented orthogonally relative to each other.

On the side of the detection unit, preferably the use of one or more suitably formed gratings may be provided for generating the phase-shifted interference signals in the case of the directional coding. To that end, for instance, a plurality of gratings having a certain relative displacement with respect to each other and suitable grating parameters may be used, upon which the measuring and reference beams of rays incoming from the beam-recombiner unit from different spatial directions strike. Grating parameters to be suitably set in this context are, for example, the line height or the line width, etc.

As an alternative, and preferably in the case of the polarization coding, suitable detection units may also include various polarization-optical components such as one or more polarizers, polarization-optical beam-splitter elements, etc. The pair of reference and measuring beams of rays, collinearly superimposed by the beam-recombiner unit, may be split by many types of optical elements into the pairs of reference and measuring beams of rays that are assigned to the respective detector elements in the detection unit for the phase-shifted interference signals. Among the options for this are, for example, gratings, neutral beam-splitter elements or polarization-optical beam-splitter elements.

As already mentioned above, it is provided in the optical distance-measuring device that the beam of rays emitted by the light source is able to swivel about the center of the stationary reference retroreflector. Two possibilities for the arrangement of such swivel units are explained below with reference to FIGS. 9a and 9b.

Figure 9A:
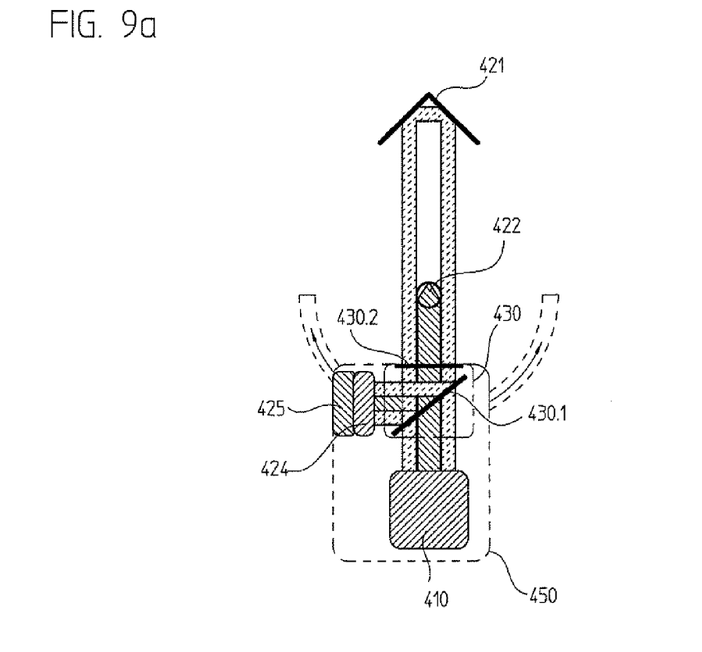
FIGS. 9a and 9b each illustrate an arrangement for the swivel unit in the optical distance-measuring device.

The variant of the optical distance-measuring device illustrated in schematic fashion in FIG. 9a is based on the beam path of the second exemplary embodiment, which was already explained above with reference to FIGS. 5a and 5b. In this variant, light source 410, polarization-optical component 430, beam-recombiner unit 424 and detection unit 425 are disposed in swivel unit 450. As indicated by the arrows in FIG. 9a, swivel unit 450 is able to swivel about the center of stationary reference retroreflector 422. In this manner, the interferometer measuring arm can be made to follow the measuring retroreflector, movable in space, for the interferometric distance measurement.

Figure 5A:
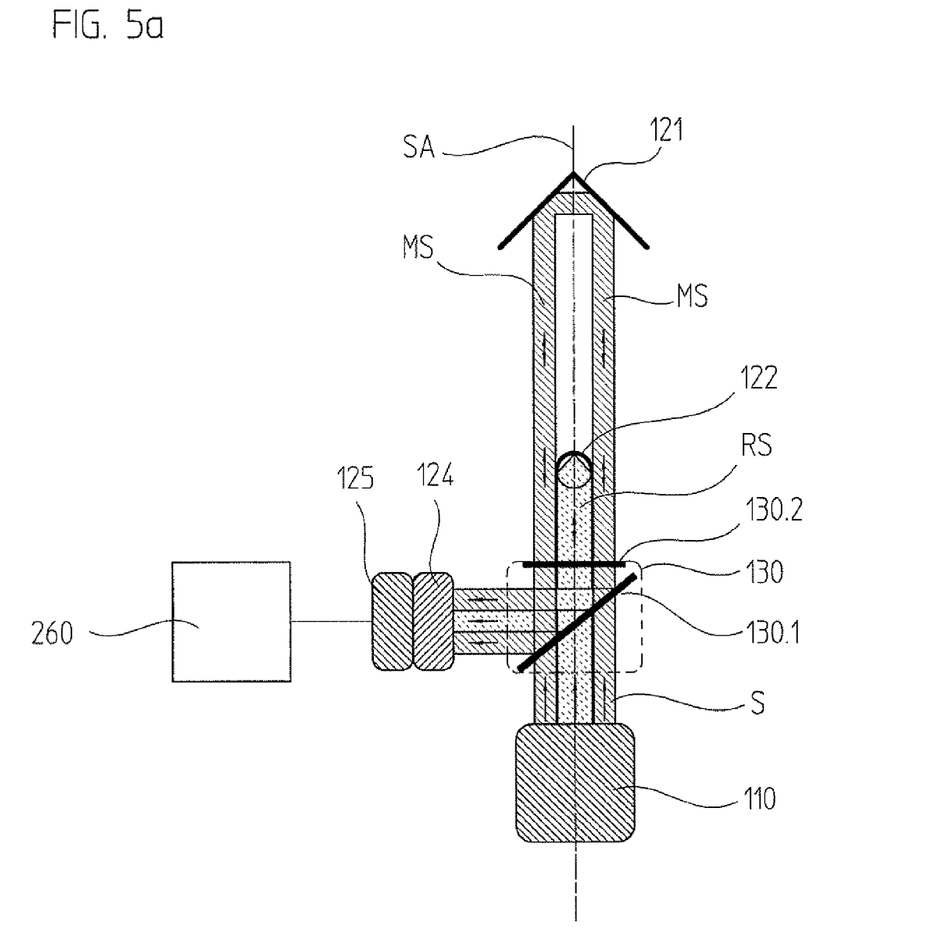
FIG. 5a is a schematic view of an optical distance-measuring device according to an example embodiment of the present invention.
Figure 5B:
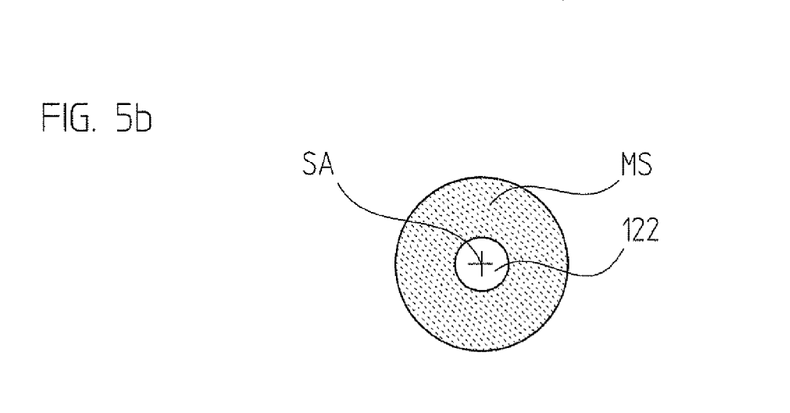
Figure 9B:
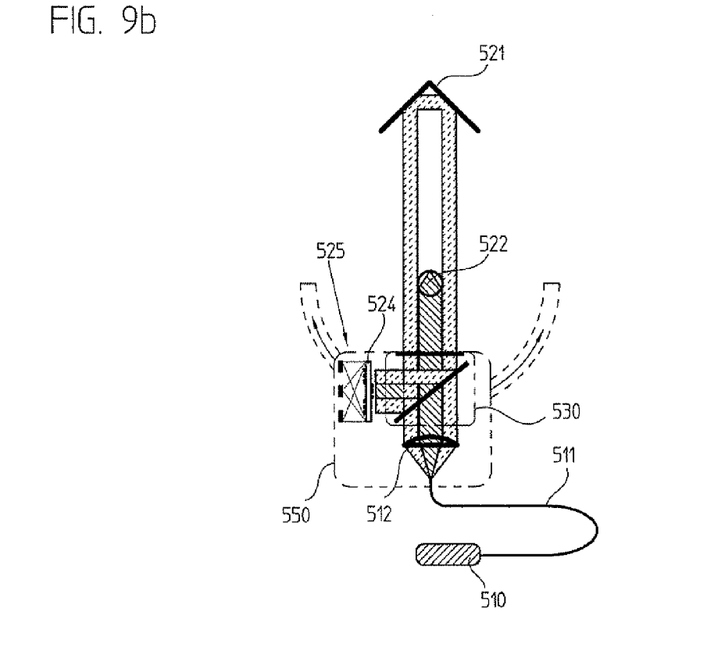

An alternative variant of the optical distance-measuring device, which is based on the beam path according to the second exemplary embodiment illustrated in FIGS. 5a, 5b, is shown schematically in FIG. 9b. Here, it is provided to dispose light source 510 outside of swivel unit 550, and to supply the beam from light source 510 to swivel unit 550 via an optical fiber 511, that is, on the part of light source 510, only the end of optical fiber 511 on the coupling-out side is disposed in the swivel unit. Collimating optics 512 are arranged in front of the outcoupling-side end of optical fiber 511 in swivel unit 550 in order to provide a collimated beam of rays for the beam path of the interferometer unit. Polarization-optical component 530 as well as beam-recombiner unit 524 and detection unit 525 are also arranged in swivel unit 550. As indicated by the arrows, swivel unit 550 is able to swivel about the center of stationary reference retroreflector 522 in this case, as well, so that the ability of the beam of rays emitted by the light source to swivel about reference retroreflector 522 is thereby ensured.

It should be pointed out that the optical distance-measuring device also includes a tracking unit, which makes the beam of rays, able to swivel about the center of the reference retroreflector, follow the measuring retroreflector when it moves in space. To that end, a tracking-detection device must generate a suitable tracking signal which characterizes the instantaneous orientation of the measuring beam of rays in relation to the measuring retroreflector.

For that purpose, for example, after the impinging of the measuring retroreflector, it is possible to couple out a portion of the measuring beam of rays by a beam splitter in the measuring arm, and to ascertain the beam position, and consequently the amount of deviation from the ideally aligned position of the measuring retroreflector, using an assigned position-sensitive planar detector element. Alternatively, directional information with respect to the displacement effected by the measuring retroreflector may be obtained via a plurality of detector elements that are situated, facing the measuring retroreflector, on beam-limiting diaphragms in the measuring arm of the interferometer unit.

With the aid of the tracking signals thus generated, the measuring beam of rays is then made to follow the measuring retroreflector by a suitable control, by appropriately positioning the swivel unit provided.

In addition to these variants for the guiding of the measuring beam of rays, other conventional methods may also be used for this purpose.

What is claimed is:

1. An optical distance-measurement device, comprising:
    a light source; and
    an interferometer unit having a measurement retroreflector, a stationary reference retroreflector, a beam-splitter element, a beam-recombiner unit, and a detection unit;
    wherein a beam of rays emitted by the light source is swivelable about a center of the reference retroreflector;
    wherein the beam-splitter element is adapted to split the beam of rays arriving from the light source into at least one measurement beam of rays and a reference beam of rays;
    wherein the at least one measurement beam of rays propagates in a direction of the measurement retroreflector and the reference beam of rays propagates collinearly with respect to the at least one measurement beam of rays in a direction of the reference retroreflector;
    wherein the measurement retroreflector is adapted to reflect back the measurement beam of rays and the reference reflector is adapted to reflect back the reference beam of rays in a direction of the beam-recombiner unit, the at least one measurement beam of rays, prior to and after reflection at the measurement retroreflector, traveling symmetrically relative to the reference retroreflector;
    wherein the beam-recombiner unit is adapted to bring the at least one measurement beam of rays and the reference beam of rays to interference; and
    wherein the detection unit is adapted to ascertain distance-dependent interference signals.

2. The optical distance-measurement device according to claim 1, wherein the beam-recombiner unit includes at least one optical element adapted to compensate for misalignment between at least one measurement beam of rays falling on it and the reference beam of rays falling on it, and to superimpose them collinearly such that the detection unit is able to generate a plurality of collinearly superimposed pairs of measurement and reference beams of rays with interference signals phase-shifted relative to each other.

3. The optical distance-measurement device according to claim 1, wherein at least one measurement beam of rays, prior to and after retroreflection at the measurement retroreflector, travels axisymmetrically relative to an axis of symmetry of the retroreflection that is parallel to a direction of incidence of the beam of rays incoming from the light source, and extends through a center of the reference retroreflector.

4. The optical distance-measurement device according to claim 1, further comprising:
    a swivel unit adapted to swivel about a center of the stationary reference retroreflector and in which at least the beam-recombiner unit, the detection unit, and one of (a) the light source and (b) an outcoupling-side end of an optical fiber are disposed, so that the beam of rays emitted by the light source is swivelable about the reference retroreflector; and
    a tracking unit, adapted to make the swivel unit follow the measurement retroreflector, including a tracking-detection device adapted to ascertain an instantaneous alignment of the at least one measurement beam of rays in relation to the measurement retroreflector.

5. The optical distance-measurement device according to claim 1, further comprising an evaluation unit adapted to determine, from the interference signals ascertained via the detection unit, a distance between a center of the reference retroreflector and a center of the measurement retroreflector.

6. The optical distance-measurement device according to claim 1, wherein the reference retroreflector is spherical, so that at least a portion of the reference beam of rays falling on it is focused by the reference retroreflector onto a reflective inner surface of the sphere, and from there, the reference beam of rays is reflected back in a direction of the beam-recombiner unit, and the reference retroreflector is one of: (a) formed of one transparent sphere, and the sphere material has a refractive index of n=2; and (b) formed of a plurality of sphere shells having different refractive indices and different radii.

7. The optical distance-measurement device according to claim 1, wherein a beam of rays emitted by the light source has a beam cross-section that is larger than a diameter of the reference retroreflector, and the reference retroreflector is arranged as a geometrical beam splitter in a beam path of the beam of rays emitted by the light source and is adapted to split the beam of rays into a measurement beam of rays and a reference beam of rays.

8. The optical distance-measurement device according to claim 7, wherein the reference beam of rays is reflected by the reference retroreflector back in a direction of the beam-recombiner unit, and the measurement beam of rays propagates in circular-symmetrical fashion with respect to the reference retroreflector in a direction of the measurement retroreflector and back in a direction of the beam-recombiner unit.

9. The optical distance-measurement device according to claim 7, wherein the beam-recombiner unit includes at least one first grating via which a superimposition of the parallel-displaced measurement beam of rays and reference beam of rays falling on it results at one location, and the measurement beam of rays and reference beam of rays are collinearly superimposed via at least one second grating.

10. The optical distance-measurement device according to claim 1, wherein the beam-splitter element includes at least one grating, from which a partial beam of rays diffracted in the zeroth order of diffraction functions one of: (a) as a measurement beam of rays which propagates in a direction of the measurement retroreflector, and a partial beam of rays diffracted by the grating into a further order of diffraction functions as a reference beam of rays that propagates in a direction of the reference retroreflector; and (b) as a reference beam of rays which propagates in a direction of the reference retroreflector, and a partial beam of rays diffracted by the grating into a further order of diffraction functions as a measurement beam of rays that propagates in a direction of the measurement retroreflector.

11. The optical distance-measurement device according to claim 1, wherein the beam-splitter element includes at least one polarization-optical beam-splitter element, from which a transmitted partial beam of rays functions one of: (a) as a measurement beam of rays which propagates in a direction of the measurement retroreflector, and a partial beam of rays which is reflected by the beam-splitter element and which has a polarization oriented perpendicularly to the measurement beam of rays functions as a reference beam of rays that propagates in a direction of the reference retroreflector; and (b) as a reference beam of rays which propagates in a direction of the reference retroreflector, and a partial beam of rays which is reflected by the beam-splitter element and which has a polarization oriented perpendicularly to the reference beam of rays functions as a measurement beam of rays that propagates in a direction of the measurement retroreflector.

12. The optical distance-measurement device according to claim 11, wherein the beam-recombiner unit includes at least one polarization-optical beam-splitter element, via which a collinear superimposition of the parallel-displaced measurement beam of rays and reference beam of rays, polarized perpendicularly relative to each other and falling on the beam-splitter element, results at one location.

13. The optical distance-measurement device according to claim 1, wherein a polarization-optical component, which includes a polarization-optical beam-splitter element and a lambda/4 plate, is arranged in front of the reference retroreflector in the beam path of the beam of rays emitted by the light source, so that:
   a linearly polarized beam of rays incoming from the light source transmits the polarization-optical beam-splitter element without loss;
   the beam of rays subsequently passes through the lambda/4-plate a first time;
   the measurement beam of rays and reference beam of rays, reflected back by the measurement retroreflector and the reference retroreflector, pass through the lambda/4 plate a second time; and
   then the measurement beam of rays and the reference beam of rays strike the polarization-optical beam-splitter element again, from which a complete reflection of the measurement beam of rays and the reference beam of rays takes place in a direction of the beam-recombiner unit.

14. The optical distance-measurement device according to claim 1, wherein the detection unit includes at least one grating which the measurement beam of rays and the reference beam of rays, reflected back by the measurement retroreflector and the reference retroreflector, strike with different angles of incidence after deflection by an upstream optical element, at least one of (a) the grating is arranged spatially and (b) grating parameters are selected such that, starting from the grating, beam pairs made up of diffracted measurement beams of rays and reference beams of rays propagate in at least three different spatial directions, in a direction of detector elements, by which the interference signals, phase-shifted relative to each other, are generatable.

15. The optical distance-measurement device according to claim 1, wherein the detection unit includes at least one polarization-optical component at least one of (a) arranged and (b) formed such that a plurality of phase-shifted interference signals are generatable from collinearly superimposed measurement beams of rays and reference beams of rays polarized perpendicularly relative to each other.

* * * * *